UNITED STATES PATENT OFFICE.

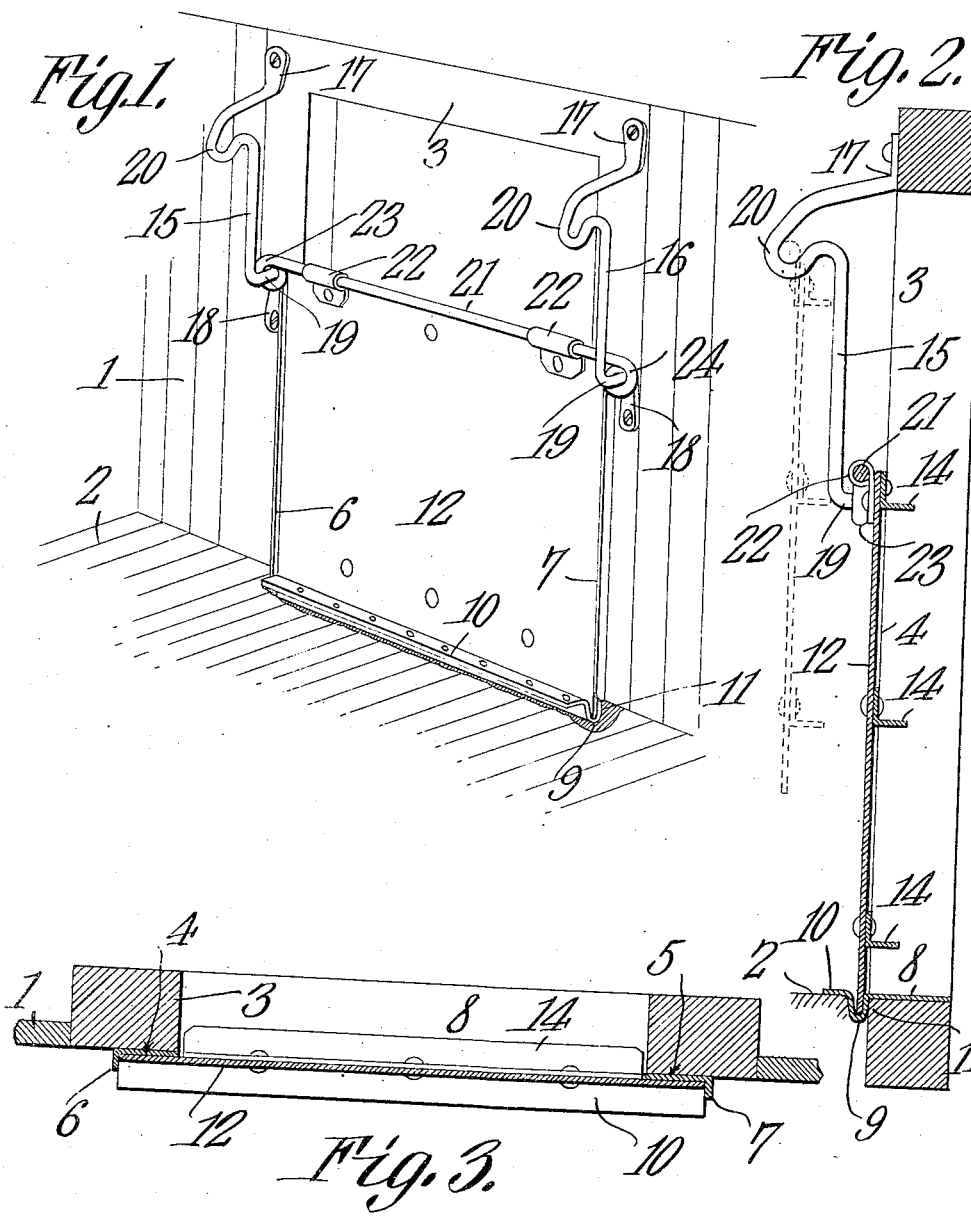

SIMEON G. STAPP, OF PHILLIPSBURG, KANSAS.

CAR-DOOR.

No. 884,234.

Specification of Letters Patent.

Patented April 7, 1908.

Application filed May 7, 1907. Serial No. 372,299.

*To all whom it may concern:*

Be it known that I, SIMEON G. STAPP, a citizen of the United States, residing at Phillipsburg, in the county of Phillips and State of Kansas, have invented a new and useful Car-Door, of which the following is a specification.

The present invention relates to improvements in doors for railway cars and similar receptacles, and it has for its object to provide an improved car door that is especially adapted for use on cars adapted to carry grain, it being so mounted relatively to the car that leakage and consequent loss of its contents is prevented, and the door cannot become displaced relatively to the door opening, nor can it become distorted, and, furthermore, it has for its object to provide an improved means for locking the door in closed position and for supporting it when opened, the parts being simple in construction so that they may be manufactured cheaply, and are light in weight, enabling them to be easily handled.

To these and other ends, the invention comprises the various novel features of construction and combination and arrangement of parts, which will be hereinafter more fully described and set forth particularly in the appended claims.

In the accompanying drawing:—Figure 1 is a perspective view of the side of a car as viewed from the interior, showing a door constructed in accordance with the present invention. Fig. 2 represents a central vertical section through the door shown in Fig. 1. Fig. 3 represents a horizontal section through the door and the coöperating portions of the car.

Corresponding parts in the several figures are indicated throughout by similar characters of reference.

In the present embodiment of my invention, the door is shown in connection with an ordinary box car adapted for use in transporting grain and similar material, 1 designating the side of the car and 2 the floor, a door-frame 3 of suitable dimensions being provided in the side thereof through which the grain may be loaded and unloaded. At opposite sides of the door frame are secured a pair of vertical guides 4 and 5, those shown in the present instance being composed of strips of sheet metal of suitable thickness to afford ample rigidity, the outer edges of these strips being turned inwardly at right angles to the remainder of the strip to form flanges 6 and 7.

On the sill of the door frame is secured a casing 8, that shown in the present instance being composed preferably of sheet metal having its rear edge extended beyond the inner edge of the sill, thence bent downwardly and doubled upwardly to form a groove 9 which is open at the top and is preferably depressed below the surface of the car floor, the groove extending the full width of the door opening, the metal being extended inwardly beyond the groove portion to form an attaching flange 10 which may be secured to the floor of the car. The outer side 11 of the groove lies in close proximity to the inner side of the door sill, and it is arranged in the same vertical plane with the body portions of the vertical guides 4 and 5, which are attached to the opposite sides of the door frame.

The door 12 is of such a width as to fit closely between the vertical flanges 6 and 7 on the guides and to closely engage the flat body portions of the guides and the forward side 11 of the groove, the outer side of the door being flat and devoid of projections at the points where it engages the vertical guides and the grooved bottom of the door frame. As the bottom of the door fits into the groove when closed, inward movement that would permit the door to open or form a space between it and the door frame, is prevented. The door is preferably composed of sheet metal of a suitable thickness, as such a construction enables the door to be relatively light in weight, and, in order to reinforce or stiffen it, it is preferably provided on its outer side with one or more angle irons or flanges 14 that are riveted, or otherwise secured to the door, and they preferably extend horizontally between the sides of the door frame, the lowermost angle iron or flange being arranged adjacent to the door sill so that it may be engaged by a crow bar or other implement, for the purpose of opening the door.

The devices shown in the present instance for retaining the door in open and closed positions embody a pair of guides 15 and 16 which are secured to the opposite sides of the door frame above the level of the door, these guides being composed preferably of metallic rods of a suitable diameter, the upper ends 17 of the guides being secured to the top of the door frame, while their lower ends 18 are secured to the sides of the door frame at points intermediate their height. Adjacent to the lower ends of the guides, the rods are bent inwardly and bowed upwardly to form locking portions 19, the rods thence extending vertically to points in proximity to the top of the door frame and thence doubling inwardly to form the rests or supporting loops 20 which are offset inwardly of the locking portions 19. The part that coöperates with these guides is carried by the door and it embodies, in the present instance, a rod 21 extending horizontally across the top of the door and is rotatable in the bearings 22 secured to the upper edge of the door, the ends of the rod being rolled, or otherwise formed, into rings or eyes 23 and 24 and which encircle the respective guides at opposite sides of the door.

When it is desirable to support the door in open position, as indicated by the dotted lines in Fig. 2, the eyes on the rod carried by the door are turned inwardly about the rod as an axis, thereby disengaging them from the locking portions of the guides and permitting them to slide freely on the vertical portions of the guides when the door is lifted, the eyes following the guides until they reach the supporting loops wherein they rest and support the door in open position. In closing the door, the eyes are lifted out of the supporting loops and permitted to descend as the door is lowered, the bottom of the door entering the groove at the bottom of the door frame, and this groove serves to move the door outwardly and into coöperative relation with the flanged guides at the opposite sides of the door frame, the eyes being finally turned beneath the locking portions of the guides and thereby serving to prevent the door working its way open.

The lateral flanges extending vertically at opposite sides of the door frame and coöperating with the vertical edges of the door serve not only to prevent shifting of the door relatively to the door opening during transit of the car, but they also form sealing strips that prevent the grain or other material escaping between the door and door frame, and as the door enters the groove at the bottom of the door frame, it will be held positioned relatively to the door opening, the locking rod at the top of the door opening serving to move the upper portion of the door outwardly and hold it in coöperative relation with the door frame.

A car door embodying my present invention may be constructed cheaply of stock metal and is relatively light in weight so that it may be handled with facility and is capable of being applied to cars and other receptacles of various kinds.

What is claimed is:—

1. The combination with a door frame, of a door mounted to operate vertically relatively to the door frame, a rod rotatably mounted on the upper end of the door and provided with eyes at its opposite ends, a pair of guiding rods secured to opposite sides of the door and having substantially horizontally-extending locking portions thereon arranged to coöperate with said eyes to lock the door in closed position, said guiding rods extending to the upper portion of the door frame and there formed into supporting loops, a sill plate for the door frame having a groove adapted to receive the lower end of the door, and vertical guides secured to the opposite side of the door frame and provided with flanges adapted to engage the sides of the door.

2. The combination with a door frame, and a door mounted to operate vertically relatively thereto and having a rod rotatably mounted thereon and provided with eyes at its opposite ends, of a pair of guiding rods secured to the upper portion of the door frame and having locking portions thereon arranged to coöperate with the said eyes to lock the door in closed position.

3. The combination with a door frame, and a pair of guiding rods secured to the opposite sides thereof and having substantially horizontally extending locking portions thereon, and supporting loops formed in the rods at points above and offset inwardly of the locking portions, of a door mounted to operate vertically relatively to the door frame, and a rod rotatably mounted on the upper portion of the door and having a pair of eyes arranged at opposite sides of the door and slidable on said guiding rods, the eyes coöperating with the locking portions and the supporting loops thereon for retaining the door in closed and open positions, respectively.

In testimony that I claim the foregoing as my own, I have hereto affixed my signature in the presence of two witnesses.

SIMEON G. STAPP.

Witnesses:
N. C. MELDRUM,
H. W. WHITE.